June 17, 1930.  L. BRUEHL  1,764,195
EVAPORATOR
Filed May 19, 1927  2 Sheets-Sheet 1
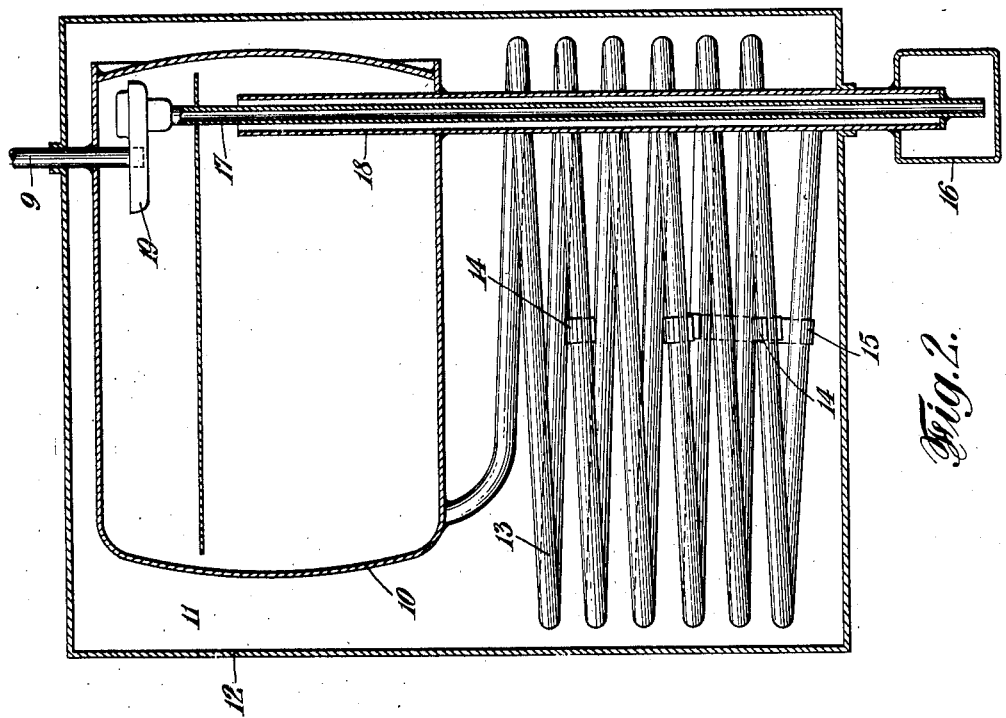
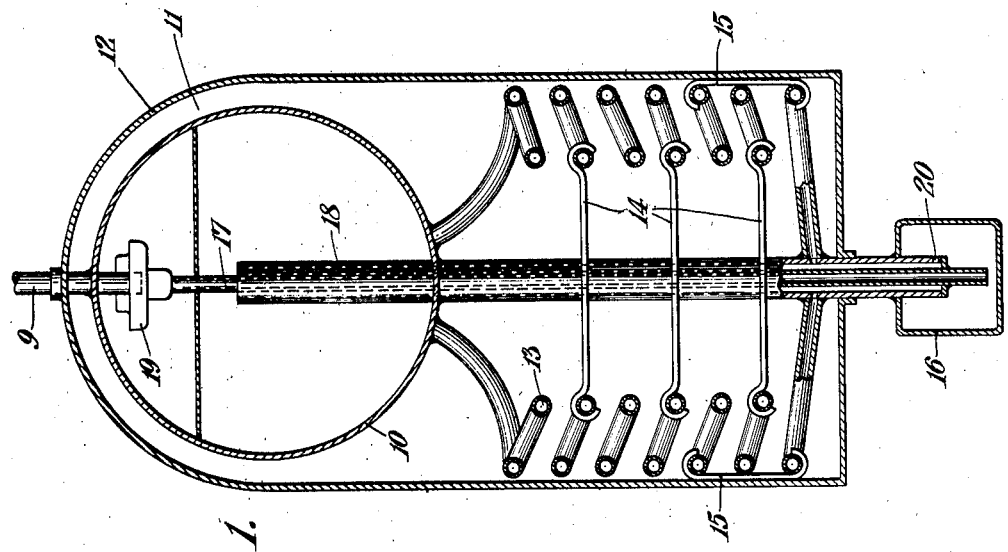

June 17, 1930.                L. BRUEHL                1,764,195
EVAPORATOR
Filed May 19, 1927          2 Sheets-Sheet 2

Inventor
Laurence Bruehl
By his Attorneys

Patented June 17, 1930

1,764,195

UNITED STATES PATENT OFFICE

LAWRENCE BRUEHL, OF BROOKLYN, NEW YORK, ASSIGNOR TO GAS REFRIGERATION CORPORATION, OF SCRANTON, PENNSYLVANIA, A CORPORATION OF DELAWARE

EVAPORATOR

Application filed May 19, 1927. Serial No. 192,530.

This invention involves certain improvements in evaporators for use in an intermittently operating refrigerating apparatus of the absorption type. In this type of refrigerating apparatus, the refrigerant gas is separated from the absorbent liquid by the action of heat, and is thereafter cooled to effect the liquefaction thereof.

In such an apparatus the pressure is practically uniform throughout the extent of the system, the boiler-absorber unit being in open connection with the evaporator through the condenser. Any differences in pressure are caused by liquid columns or by wall friction in the tubes; but these differences are very small in relation to the general pressure, especially during the boiling period so that they need not be considered.

During the boiling period the refrigerant gas, for instance, ammonia, is expelled from the absorbent, condensed, and collected as a liquid in the evaporator. Ideal conditions require that all the condensing or liquefying action take place in the condenser, but in practice it often happens that a large amount of ammonia gas passes through the condenser and is liquefied in the evaporator. Thus, the latent heat of liquefaction is given out in the chamber to be cooled rather than being withdrawn from the system in the condenser.

The objectionable condensation taking place on the inside surface of the evaporator warms up the brine, when a brine tank is used, or the latent heat escapes directly into the ice box if no brine tank is used. The amount of heat which is thus delivered again to the refrigerator is dependable on two factors:

1. The temperature of those parts where the condensation takes place; and
2. The rapidity with which the heat can escape into the refrigerator.

The object of the present invention is to avoid as far as possible this condensation in the evaporator without using a valve or other movable machine part, and to thus secure a very great increase in the efficiency of the evaporator.

In carrying out my invention, I provide for an increase in the temperature of that portion of the surface of the evaporator where the condensation takes place, over the temperature of the cooling water. By so increasing this temperature there is obtained a lower average box temperature. To accomplish this I insulate that part of the evaporator where the condensation takes place, so that the heat cannot go to another part of the evaporator or of the refrigerator. Thus the latent heat of condensation serves only to increase the temperature of those parts where the condensation takes place. When the temperature of those parts where the condensation takes place has reached a certain point a little above the temperature of the cooling water, the condensation stops automatically and all further condensation takes place in the condenser, where it is desired, and the heat is thus carried off by the cooling water, and no further heat is delivered to the chamber to be cooled.

A slight further condensation takes place in the evaporator to keep up the above mentioned high temperature, but this condensation is very small especially when a good insulator is applied. Air is the best insulator for this purpose, it having a very low heat storage capacity. Also it is a good heat conveyor so that a strong air circulation prevails during the absorption period inside the evaporator, which circulation is stopped automatically during the boiling period as hereinafter described.

The rapidity with which the heat can escape depends on the kind of insulation which is used, and tends to permit the above mentioned high temperature, which is necessary to stop the condensation. When, for example, a brine is used, a great amount of heat escapes into the brine, because the brine has a very great heat storage capacity.

As another important feature of my invention, I so design the evaporator that the area of the inside surface of the evaporator on which the condensation takes place is small in relation to the total surface of the evaporator. The second mentioned factor can be controlled to a large extent. By using the ammonia liquid as an insulation, I am able to closely approach the ideal conditions. I make the surface with which the gas contacts during the boiling period, a minimum and the cooling surface a maximum, or nearly as great as the whole surface of the evaporator.

This surface relationship is preferably secured by forming the evaporator with a main body or chamber with approximately the maximum volume for the surface area attached to a lower part of a coil or other conduit so as to give approximately the maximum practical surface area for the volume.

In the accompanying drawings, there are diagrammatically illustrated certain embodiments of the invention.

In these drawings:

Fig. 1 is a vertical cross section of one form of the evaporator,

Fig. 2 is a vertical longitudinal section of the form shown in Fig. 1,

Figure 3:
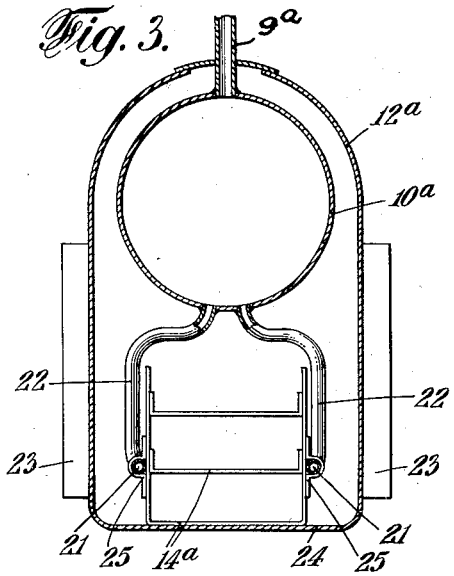
Fig. 3 is a cross-section on a smaller scale of another form.

In Fig. 1, there is illustrated an evaporator the size, form and construction of which may be varied, depending upon the character of the apparatus in connection with which it is to be used and which is to be cooled thereby. The evaporator includes an upper part shown as a simple cylindrical drum 10, and communicating with the upper part thereof is a conduit 9 which serves for the delivery of the liquefied refrigerant to the evaporator during the heating period and for the return of gas from the evaporator during the absorbing or cooling period.

The lower part of the evaporator 10 connects with the coil 13, which may serve as a support for a plurality of ice tray supports 14. Surrounding the evaporator 10 and coil 13 is the housing 12, to which are fitted contact or heat conducting pieces 15, which partly encircle and firmly engage the lower tubes of the coil 13. Between the casing and the body of the evaporator 10 is an air space 11.

A liquid receiving chamber or sump 16 communicates with the upper part of the evaporator 10 through a pipe 18 provided at its lower end with a minute aperture 20 in the chamber 16. The coil 13 at its lower end opens into the pipe 18 adjacent to the lower end of the latter, but above the aperture 20 so that liquid flowing out of the lower end of the coil may enter the pipe 18 and the unevaporated part may collect in the sump which gas may rise in the pipe 18 into the body of the evaporator 10.

In the upper part of the body of the evaporator is a cup compartment or chamber 19 into which the supply and outlet pipe 9 extends. Also communicating with this cup is a conduit 17 which leads to the lower part of the sump or liquid receiving chamber 16 and is disposed preferably within and spaced from the conduit 18.

The ammonia which has passed through the condenser, enters the evaporator through the tube 19 and overflows from the cup 19 into the body of the evaporator 10. From there it enters the upper end of coil 13 and, if in a gaseous form, condenses in the coil and the liquid flows to the lower part thereof. The coil 13 in a relatively short time is filled up so that no further condensation takes place in the coil 13 and no further heat is delivered to the ice trays.

Thereafter all further condensation of ammonia gas which has not been condensed in the condenser must take place in the vessel 10. The latent heat which is released by the condensation and goes through the wall of the vessel 10, finds a high resistance in the air space 11. Such part of the heat as passes the air space 11 and enters the wall of the housing 12 may be conducted along the housing 12 to the lower part of the evaporator to warm up the contact piece 15, the coil 13 and lower ice trays on the supports 14.

In the trays the heat is absorbed by the ice. Practice has shown that at the end of the boiling period not more than 3 to 5 per cent of the ice was melted. By this arrangement of the housing 12 which has no contact with the evaporator except by contact pieces 15, it is found that the temperature of the storage chamber or box in which the apparatus is placed does not vary much more than when a brine tank is used, but the efficiency of the evaporator with air in the space 11 is about 50 to 90 per cent higher than it is possible to obtain in a usual brine evaporator under the same capacity and under the same conditions. But very much more remarkable is the ice making efficiency of this evaporator. When the ice trays are filled with water shortly after the boiling period and the machine is running with 60° F. cooling water, 54 ice cubes are ready for table use in about two hours. When no ice is used the temperature of the ice goes down to zero and stores up a certain amount of cold. This cold is reflected in the form of a temperature wave towards the outside surface of the evaporator in about the middle of the absorption cycle.

During the boiling period the temperature rises at the start to a certain level due to the condensation of gas in the coil, but as soon as the lower part of the coil with the contact pieces 15 is filled with liquid ammonia, the influence of the ice decreases the surface temperature again and exerts also a cooling effect upon the refrigerator box. At the same time it draws the heat down and absorbs the heat which passes the air insulation 11 so that no heat can escape from the evaporator into the refrigerator box. The increase of box temperature during the boiling period is caused by the entrance of heat through the box walls.

The contact pieces 15 and the tray supports are made preferably from copper or aluminum and offer a very low resistance to the conduction of heat so that all water in the trays is frozen in about two hours, when it is put in shortly after the boiling period. During the absorption period the air inside the evaporator is cooled down far below the freezing point of the water due to the great surface of the evaporator, and also because it is enclosed, and aids the formation of the ice. The air circulates in the spaces above coils 13, the cooler air goes down along the walls of vessel 10 onto the upper tray and rises on the inside wall of housing 12. This current stops automatically during the boiling period.

Another important feature of the present invention is the separation of the non-volatile portion of the fluid from the volatile portion. This non-volatile portion may be a small amount of water which has come over from the boiler during the boiling period. When the evaporation takes place in the coil, the non-volatile portion will be more concentrated on the inner surface of the tube and will form a cylindrical skin covering the inside surface of the tube. The circulation of liquid through the tube is now hindered, there being only a very small flow in both coils. This is accomplished in coil 13 by connecting the lower end with the tube 18, connecting the latter to the upper part of vessel 10 and connecting the upper end of the coil to the bottom of the vessel 10. Restricted orifices 20 are provided at the lower end of the coils to prevent liquid circulation between both coils, there being, as above mentioned, only a very small flow in both coils. As heat is absorbed by the coil, a bubble in the coil will try to ascend. In moving upward it tends to form a vacuum below it and this vacuum will be filled with liquid at a speed which is relatively higher than the speed of the bubble itself, if the bubble is large in relation to the cross-section of the tube. This liquid also moves the non-volatile film on the surface of the tube in the direction opposite to the movement of the bubble. The effect is best when the bubble nearly fills the cross-section of the tube. Every bubble exerts a backward or downward movement of the non-volatile solution and pushes the more volatile solution ahead or upward.

In this way the non-volatile film is moved down to the lower end of coil 13 towards the orifice 20. The result of this is that the non-volatile liquid tends to enter tube 18 through the orifice 20. The tube 18 is so dimensioned that the speed of evaporization in relation to the volume is greater in tube 18 than it is under normal working conditions in the rest of the evaporator. This means that the contents of tube 18 evaporate faster and the tube exerts an attraction, by virtue of the difference in liquid levels, upon the liquid in the lower ends of coils 13, so that after awhile the non-volatile solution is concentrated near or in the tube 18.

If for any reason one coil, for instance the one at the left side contains more non-volatile liquid than the other coil at the right side, the ebullition in the right coil will be stronger and the non-volatile liquid in the left coil will be drawn down by a force exerted by the right coil until the non-volatile solution is symmetrically distributed in both coils. The non-volatile solution is thus obtained at the end of the absorption period in tube 18 or in the lower ends of coils 13, where it is ready to flow into compartments 16, from which it is removed back to the absorber. The operation of compartment 16 is broadly described and covered in the copending application Serial No. 158,846, filed Jan. 4, 1927.

During the absorption period liquid remaining in the chamber 16 will generate gas which escapes through the port 20, but no evaporation will take place in the tube 17 because this tube is at a lower temperature. After a certain time interval the development of gas in the chamber 16 will decrease or stop and a state of equilibrium is obtained. This state of equilibrium prevails during nearly the whole of the absorption period unless it is destroyed by the application of heat, for instance, by touching the chamber 16 with the hand. The resulting sudden development of gas ejects liquid from the tube 17 into the cup 19. If the parts are properly dimensioned the equilibrium will be attained again in a short time.

The cold transmitted to the housing 12 through the contact pieces 15 travels upwardly through the walls of this housing and is in counterflow with the air currents of said housing. Thus the portion of the housing in engagement with the contact pieces 15 does not become as cold as the contact pieces 15 would be if the housing were omitted. By means of the housing the cooling surface exposed to the air is larger in area, but not so low in temperature as is the case where the cooling is by direct contact with smaller parts of much lower temperature. The air is effectively cooled by the large area, but not to a temperature which results in as much condensation of humidity as is the case where the air is cooled by a smaller area of cooling surface of much lower temperature. As a result the air retains a larger amount of humidity and when it passes down into the body of the refrigerator and there mixes with the warm air, the percentage of humidity in the body of the refrigerator will be higher than it would be if more moisture had been condensed out by a small extremely cold member. Thus the larger the surface of the housing 12 the higher is the percentage of humidity of the air in the body of the box for the same cooling effect.

The contact pieces 15 assure a steady transfer of heat from the housing 12. They also form a resistance against an excessive delivery of cold to the ice box. In the same way the air insulation 11 serves the purpose of producing a drop in temperature between the housing 12 and the vessel 10 during the absorption period as well as during the boiling period. Hence the housing 12 acts indirectly to decrease the pressure in vessel 10 and to increase the efficiency of the evaporator by lowering the temperatures. The housing 12 shortens the time of ice making in two ways, first by cooling the air in the evaporator and by keeping it separated from the outside, and second by lowering the temperature of the evaporator itself.

I avoid the formation of gas at too fast a rate, as the gas itself serves to prevent the entrance of the liquid to the lower part of the coils where the gas is being produced.

The construction shown in Fig. 3 illustrates the structure with the contact pieces 15 omitted, the lower tray supports serving the purpose of the contact pieces. This construction is intended for an intermittently working absorption machine in which a solid absorbent is used. In such an evaporator the purging device is not needed and therefore the construction can be simplified. The heat conductive plates for the ice trays form one system. The lower part of the ice support 14$^a$ is in good thermal contact with the lower part 24 of the housing 12$^a$, which has radiating fins 23 on the outer surface. The ice tray support 14$^a$ is attached to the horizontal tubes 21 by clamps 25 which serve at the same time as a good heat conductor from the tubes 21 to the support 14$^a$. A part of the cold goes from tube 21 to the lower part of the ice tray support 14$^a$ and enters the lower part 24 of the housing 12$^a$. Then the cold rises and spreads over the large surface of the housing 12$^a$ with the radiating fins 23 on the outer surface. Both ends of one of the tubes 21 are welded to the lower part of the vessel 10$^a$, so that the tubes 21 are filled with refrigerant liquid. The tube 21 must be inclined a little so that the gas developed in tube 21 escapes through one of the vertical pipes 22 only and the gas developed forces a good circulation of the liquid.

This construction is especially advantageous in connection with a solid absorbent, if an excessive amount of liquid refrigerant is in the system, so that the tubes 21 and the higher ends are still filled with liquid at the end of the absorption period. In this manner there is avoided a condensation in the tubes 21 and the upper end at the start of the boiling period. All condensation is forced to take place in the vessel 10$^a$. There is a very high thermal resistance from the vessel 10$^a$ to the ice tray supports and to the ice trays themselves so that the ice does not melt during the boiling period. The heat conducting housing 12$^a$ is closed on top, where the refrigerant delivery tube 9$^a$ passes the housing, the closure being effected by a poor conductor of heat, such as Monel metal, for example. The heat of condensation is therefore prevented from flowing from the main vessel 10$^a$ through pipe 9$^a$ to the upper part of the housing 12$^a$.

Figure 4:
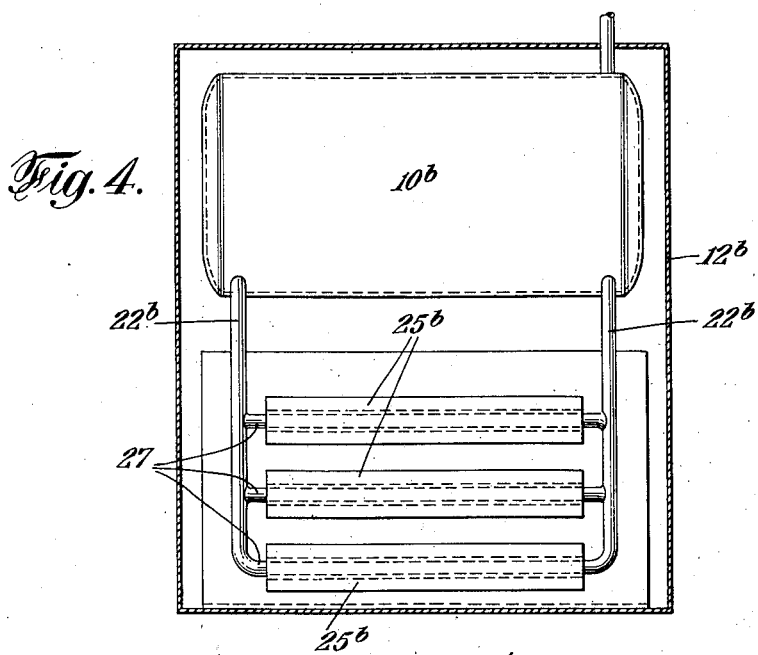
Fig. 4 is a longitudinal section of the form shown in Fig. 3.

In Fig. 4, I have shown a construction in which there are a plurality of horizontal tubes 27 connected to a vessel 10$^b$ by the vertical tubes 22$^b$. The tubes are in good thermal contact with the ice tray support by means of the clamps 25$^b$.

But on the other hand it must be considered that an increase in diameter of the tube 21 or the number of the tubes 27 decreases the form factor of the lower part of the evaporator very rapidly. For example, the form factor of a construction outlined in Fig. 3 is less than two, if the diameter of the tube 21 increases approximately to 17% of the diameter of the vessel, supposing that the vessel 10$^a$ has the ratio of length to diameter equal to two. So the advantage represented by the form factor would be lost with a consequently greater amount of ice melted during the boiling period, as well as a greater amount of heat entering the refrigerator box during the boiling period.

Figure 5:
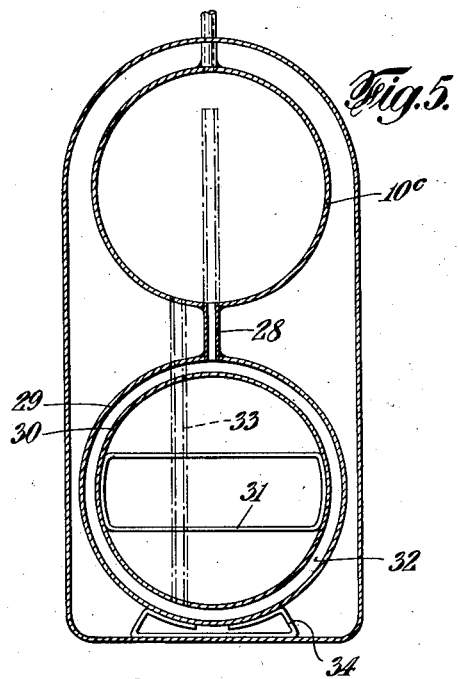
Fig. 5 is a vertical cross-section through a third form.

Fig. 5 shows a construction having a very high ice making velocity owing to the rapid production of cold with resulting speed of freezing.

The lower part of the evaporator comprises two cylindrical concentric drums 29 and 30. The interior of drum 30 is subdivided by a heat conducting support 31 into compartments for the ice trays. The drums 29 and 30 are welded together at both ends. The space 32 between the drums is adapted to be filled with the liquid refrigerant. The smaller the space 32 the greater will be the form factor of the evaporator. But of course, there is a limit, because the gas must be able to escape and the liquid must be able to enter this space. The upper part of space 32 is connected to the main vessel 10$^c$ of the evaporator by a tube 28. The rate of ice making can be controlled by dimensioning the cross-section of the tube 28. Two or more tubes can be arranged so that one is for the delivery of the refrigerant to the lower part and the remainder for the escape of the gas. In that case the tube 28 may be extended to the upper part of the vessel 10$^c$ and a tube 33 leading from the lower part of vessel 10$^c$ to the lower part of the cylindrical space. In this manner a circulation may be maintained down through tube 33 and up through tube 28. When the development of the gas is more rapid than a certain predetermined rate, so that not all of it can escape through the tube 28, the upper part of the space between the drums 29 and 30 will be filled with gas, the liquid circulation being stopped immediately and a part of the liquid is pushed back up through tube 33. Therefore it will be seen that the rate of the gas production can be controlled by controlling the diameter of tube 28. A high velocity in the gas production is desirable, but when this gas production is too fast foaming will take place in vessel $10^c$, and the efficiency of the evaporator will be decreased considerably.

In the construction illustrated in Fig. 5 the form factor increases as the space 32 decreases. The form factor exceeds the value two as soon as the space 32 is smaller than 11.5% of the mean diameter of this space, assuming that this mean diameter is equal to the diameter of vessel $10^c$ and further assuming that the length of all cylinders is equal to twice the diameter of the vessel $10^c$.

The above mentioned regulation of the rate of gas production is applicable to every evaporator for an intermittently operating absorption machine. However, the highest efficiency is obtained when a solid absorber is used, because there are no non-volatile liquids in the evaporator. In a wet absorption system it is not advantageous to leave liquid in the lower part of the evaporator at the end of the evaporating period for the purpose of insulating the ice, because this remainder would increase constantly in its percentage of non-volatile liquid, to a certain value and the efficiency of the evaporator would accordingly decrease. An advantage is obtained by extending tube 28 to the upper part of vessel $10^c$, as in this way the less volatile liquid in the lower part does not further mix with the more volatile liquid in vessel $10^c$.

The contact piece 34 serves as the thermal connection between the lower part of the evaporator and the lower part of the housing. It can be omitted when the lower part of the housing is in immediate contact with the evaporator.

It may also be mentioned that the diameter of tube 28 must be smaller when the tube extends to the upper part of vessel $10^c$, because a gas passing from one gas space directly to another gas space encounters a very low resistance, but when the same gas current has to pass from one gas space to the other gas space through a liquid space, the resistance, which the gas must overcome, is considerably higher.

The evaporator illustrated in Fig. 5 has a great advantage in a system where a solid absorbent is used. In such a system an excessive amount of refrigerant can be put into the system, so that the lower part remains constantly filled with refrigerant. No condensation can take place in the lower part during the boiling period and the temperature of the upper part increases very much faster due to the condensation and warm refrigerant which enters the upper part. This is a characteristic of all constructions with a high form factor even when the lower part contains no liquid at the end of the absorption period.

The form factor hereinbefore referred to may be determined and defined as follows. Suppose the inside surface of the empty evaporator is $F_0$. When liquid is in the evaporator, the surface $F_0$ is divided in two parts: one part $F_X$ which is covered by the liquid, and another part $F_Y$ which is not covered by the liquid. Then $$F_x + F_y = F_0 \quad (1)$$

The surface of the liquid is $F_l$. The inside surface of the gas space may be $F_g$; then $$F_l + F_y = F_g \quad (2)$$

Then, the ratio $F_g : F_0$ is the ratio of the surface on which the ammonia gas is able to condense, to the inside surface of the empty evaporator. Then the decrease or loss of the inside surface is $$F_{loss} = F_0 - F_g = F_x - F_l \quad (3)$$

The loss in surface is a function of the amount of liquid which is in the evaporator, and a function of the construction of the evaporator itself. The clearest way to understand this function is by the integral $$F_{loss} = \int_0^x \left(\frac{dF_{loss}}{dV_x}\right) dV_x \quad (4)$$

$V_0$ represents the volume of the evaporator and $V_x$ is that part of the volume which is filled with liquid. We are not able to change the factor $dV_x$ (which means the same as $V_x$) except by means outside the evaporator for example, a change in boiler temperature or in the surface of the condenser, but the other factor in the parenthesis depends on the construction of the evaporator only, hence this factor is changeable by constructive means. One of the improvements of the present invention is to make this factor large in the lower parts of the evaporator, which means that a small amount of liquid must diminish a large amount of gas surface. This factor in combination with $F_0$ and $V_0$ is the "form factor" referred to in this specification and claims and is represented by "$W$".

For the purpose of comparison the above integral may be taken as a whole as it is given by $F_{loss}$. The ratio of $$F_{loss} : F_0 = x_F \quad (5)$$

The quantity of $x_f$ may be expressed in per cent. The ratio of $$V_x : V_0 = x_V \quad (6)$$

$V_0$ is the entire contents of the evaporator and $X_v$ can also be expressed in per cent. Then:

$$X_F : X_V = W \quad (7)$$

The form factor $W$ is a characteristic function for every evaporator. The surface conditions of evaporators, no matter what kind, form or construction is used, are expressed and compared in a very clear form by the factor "W". For example, two evaporators of different construction may be filled ($X_v$) to 20% of the volume of each. The surface eliminated by the 20% liquid may be $X_F=12\%$ for the first evaporator. Then the factor "W" is 12 divided by 20 equal 0.6. In the second evaporator only 8% of the surface is eliminated, hence 8 divided by 20 equals 0.4.

The factor 0.6 of the first evaporator is 50% larger than the corresponding factor of the second evaporator, which means that the first evaporator eliminates a 50% greater surface of condensation than the second one considered under the same relative conditions.

We are mostly interested in the factor "W" for the different regions of one and the same evaporator. In the upper part of an evaporator, "W" is usually a fraction less than one. "W" converges against "1" in the upper part of the evaporator, because 100% volume cannot cover more than 100% surface. The following chart shows the values of "W" for a sphere.

|  | $X_F\%$ | $X_v\%$ | "W" |
| --- | --- | --- | --- |
|  | Per cent | Per cent |  |
|  | 100 | 100 | 1 |
| Upper part | 81 | 97 | 0.895 |
|  | 64 | 89.5 | 0.72 |
|  | 49 | 78.6 | 0.62 |
|  | 36 | 65 | 0.55 |
| Middle part | 25 | 50 | 0.5 |
|  | 16 | 35.3 | 0.452 |
| Lower part | 8.9 | 21.6 | 0.416 |
|  | 4 | 10.4 | 0.384 |
|  | 1 | 2.8 | 0.36 |

Thus it will be seen that the value of "W" decreases toward the lower part of the sphere.

My improved evaporator differs from a sphere or other simple shapes in that the ratio of the surface to the volume of liquid required to cover the surface gives a "form factor" W greater than 2.

Among the improvements which the present invention presents are:

1. That the mathematical norm is found, which comprehends and expresses the surface conditions of an evaporator.

2. That the said mathematical norm gives a clear idea of the efficiency of an evaporator which is in open communication with the condenser during the boiling period.

3. That the said mathematical norm can be changed by varying the design in such a way, that the best possible efficiency of the evaporator is secured.

4. That the separation of the less volatile solution from the more volatile solution is obtained continuously during the absorption period.

5. That the rate of cold production is limited to a certain maximum.

6. That a high ice making velocity is secured.

7. That the ice does not melt during the boiling period.

It may be noticed that the surface of baffles or other parts which are inside the evaporator, must not be considered for the calculation of the form factor. Only the inside surface, which conforms with the outside surface, must be considered.

The above description of the invention presented in this specification is to be regarded as illustrative, only, the scope of the invention being limited only by that of the following claims.

Having thus described my invention, what I claim as new and desire to secure by Letters Patent is:

1. An evaporator for an intermittently operating absorption machine having means for supplying and withdrawing refrigerant at the top thereof and having a heat conductive housing around the evaporator, the upper part of the housing being insulated from the upper part of the evaporator, and the lower part of the housing being in good thermal contact with the lower part of the evaporator.

2. In a refrigerating apparatus of the intermittent absorption type comprising a housing, a main evaporation vessel enclosed in said housing, and a coil communicating with the vessel, contact pieces transferring heat from the housing to the coil.

3. In a refrigerating system, an evaporator comprising a main vessel, a coil communicating with the vessel, and a heat conductive housing around the vessel and coil, and connected to the coil, the evaporator structure being wholly within the refrigerator housing.

4. In a refrigerating system, an evaporator comprising a main vessel, a coil communicating with the said vessel, a heat conductive housing around the vessel and coil and connected to the coil, and an air insulating space separating the housing and vessel.

5. In a refrigerating system, an evaporator comprising a main vessel, coils communicating with the said vessel, and a heat conductive housing around the vessel and coils and connected to the coils, the said vessel being separated from the housing by a material having low heat conductivity.

6. In a refrigerating system, an evaporator comprising a vessel, means for supplying and withdrawing refrigerant at the top thereof, a coil communicating with the vessel, and a heat conductive housing surrounding the coil and vessel, the lower part of the coil being in good thermal contact with the lower part of the housing thereby extracting the heat from its housing through the lower part thereof by the lower part of the coil, 7. A structure as defined in claim 6 in which the contact is made by means of contact pieces engaging the coil and the housing.

8. In a refrigerating system, an evaporator comprising a vessel and parts beneath the said vessel, and communicating therewith, the parts having a small volume with respect to the vessel, both the said vessel and parts being surrounded by a housing in thermal contact with said parts, the said parts being provided with small apertures to retard liquid circulation to a low value, thereby preventing the mixing of the less volatile solution in the lower portions of said parts with the volatile solution in the vessel.

9. An evaporator for refrigerating apparatus of the intermittently acting absorption type, including a main liquid refrigerant receiving vessel, means for supplying a refrigerant to and withdrawing it from the upper part of said vessel, a coil disposed below said vessel and having the upper end of the coil connected to the lower side of said vessel and the lower end of the coil in restricted communication with the upper part of the vessel, and a housing of heat conducting material enclosing said vessel and coil and spaced from the vessel but in heat interchanging relationship to the coil.

10. An evaporator for refrigeranting apparatus of the intermittently acting absorption type, including a vessel for receiving the liquid refrigerant, a coil disposed below the same and having its upper end connected to the lower part of the vessel and the lower end in restricted communication with the upper part of the vessel, and a sheet metal housing enclosing the vessel and coil and spaced from the vessel, and means connecting the coil and casing for transmitting heat from one to the other.

11. A refrigerator having an evaporator for a refrigerating apparatus of the intermittently acting absorption type, a heat conducting housing around the evaporator, the lower part of said housing being connected to the lower part of the evaporator to conduct cold to the upper part of the housing in counterflow to the air current of the refrigerator.

Signed at New York, in the county of New York and State of New York, this 14th day of May, A. D. 1927.

LAWRENCE BRUEHL.